(12) United States Patent
Peng et al.

(10) Patent No.: US 10,748,185 B2
(45) Date of Patent: *Aug. 18, 2020

(54) METHOD FOR IDENTIFYING BUNDLED SOFTWARE AND APPARATUS THEREFOR

(71) Applicant: iYuntian Co., Ltd., Beijing (CN)

(72) Inventors: Yunpeng Peng, Beijing (CN); Ling Guo, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 367 days.

This patent is subject to a terminal disclaimer.

(21) Appl. No.: 15/847,655

(22) Filed: Dec. 19, 2017

(65) Prior Publication Data

US 2018/0108037 A1 Apr. 19, 2018

Related U.S. Application Data

(63) Continuation of application No. 14/586,875, filed on Dec. 30, 2014, now Pat. No. 9,881,321.

(30) Foreign Application Priority Data

Jun. 30, 2014 (CN) .......................... 2014 1 0305946

(51) Int. Cl.
*G06F 9/44* (2018.01)
*G06F 9/45* (2006.01)
(Continued)

(52) U.S. Cl.
CPC ........... *G06Q 30/0256* (2013.01); *G06F 8/61* (2013.01); *G06Q 30/0276* (2013.01); *G06F 8/71* (2013.01)

(58) Field of Classification Search
CPC .. G06Q 30/0256; G06Q 30/0276; G06F 8/61; G06F 8/71
See application file for complete search history.

(56) References Cited

U.S. PATENT DOCUMENTS 8,583,672 B1 11/2013 Paskin et al.
2004/0139177 A1 7/2004 Yook
(Continued)

FOREIGN PATENT DOCUMENTS

JP 2012-48565 A 3/2012
KR 10-2012-0140569 A 12/2012

OTHER PUBLICATIONS

Marco A. S. Netto, Software Bundling Selection for Cloud Virtual Machine Images, 2013, pp. 575-580. https://ieeexplore.ieee.org/stamp/stamp.jsp?tp=&arnumber=6573035&isnumber=6572961 (Year: 2013).*

(Continued)

*Primary Examiner* — Mongbao Nguyen
(74) *Attorney, Agent, or Firm* — Orrick, Herrington & Sutcliffe LLP

(57) ABSTRACT

A method for identifying bundled software and an apparatus therefor. The method comprises: detecting a user interface for software installation; acquiring text information on the user interface; determining whether bundled software exists; and, based upon the determination, extracting the name and amount of bundled software from the text information and prompting the name and the amount of the bundled software. The embodiments may identify bundled software before installing software and avoid starting the bundled software process, having the effect of anti-bundling on the bundled software in advance. By extracting the name of the bundled software, acquiring the amount of bundled software, and prompting the name and amount of the bundled software, a user is able to determine whether to install the bundled software according to his or her requirements, thereby improving the autonomous right of selection of the user in the process of installing software.

17 Claims, 5 Drawing Sheets

(51) Int. Cl.
*G06F 9/445* (2018.01)
*G06Q 30/02* (2012.01)
*G06F 8/61* (2018.01)
*G06F 8/71* (2018.01)

(56) References Cited

U.S. PATENT DOCUMENTS

| | | |
|---|---|---|
| 2006/0143601 A1 | 6/2006 | Concha et al. |
| 2009/0158271 A1* | 6/2009 | Shima ................ G06F 8/61 717/174 |
| 2009/0276755 A1 | 11/2009 | Beltowski et al. |
| 2009/0276769 A1 | 11/2009 | Brannen, Jr. et al. |
| 2011/0113327 A1 | 5/2011 | Hagelund |
| 2012/0005626 A1 | 1/2012 | Wong et al. |
| 2012/0072871 A1* | 3/2012 | Seo ................ H04N 21/4312 715/838 |
| 2012/0084752 A1 | 4/2012 | Arnold et al. |
| 2013/0061217 A1 | 3/2013 | Charters et al. |
| 2013/0111458 A1 | 5/2013 | Quin et al. |
| 2013/0132530 A1* | 5/2013 | Asahara ............... G06F 3/1287 709/220 |
| 2013/0311271 A1* | 11/2013 | Agrawal ............... G06Q 30/02 705/14.45 |
| 2013/0332901 A1 | 12/2013 | Berg et al. |
| 2013/0337793 A1 | 12/2013 | Prakash et al. |
| 2014/0172782 A1 | 6/2014 | Schuenzel et al. |
| 2014/0282493 A1* | 9/2014 | Glover .................. G06F 8/61 717/176 |
| 2014/0298293 A1* | 10/2014 | Nishio .................. G06F 8/30 717/121 |
| 2014/0298321 A1* | 10/2014 | Morino .................. G06F 8/61 717/175 |
| 2014/0357357 A1 | 12/2014 | Boyd et al. |
| 2014/0359592 A1 | 12/2014 | Phaedrus et al. |
| 2014/0359601 A1 | 12/2014 | Constable et al. |
| 2014/0359604 A1 | 12/2014 | Salameh et al. |
| 2014/0359606 A1* | 12/2014 | Salameh ................ H04L 67/34 717/178 |
| 2015/0039431 A1 | 2/2015 | Sarshar |
| 2015/0098490 A1* | 4/2015 | Ro ..................... H04B 1/7143 375/133 |
| 2015/0113375 A1 | 4/2015 | Li |
| 2015/0178808 A1 | 6/2015 | Grossman et al. |
| 2015/0178861 A1* | 6/2015 | Gordon .............. G06Q 10/103 705/301 |
| 2015/0193215 A1 | 7/2015 | Jianu et al. |
| 2015/0242422 A1* | 8/2015 | Shapira ............... G06F 16/954 707/722 |
| 2015/0254731 A1 | 9/2015 | Ohayon et al. |
| 2016/0070765 A1* | 3/2016 | Louvau ................ G06F 8/70 717/120 |

OTHER PUBLICATIONS

Sun, et al., "An Universal Automatic Configuration Software Model Based on the Cloud Computing", Proceedings of IEEE, 2013, pp. 306-311, http://ieeexplore.ieee.org/stamp/stamp.jsp?arnumber+6823963.

Wang, et al., "Component Monitoring of OSGi-based Software", IEEE International Conference on E-Business Engineering, 2010, pp. 250-255, http://ieeexplore.ieee.org/stamp/stamp.jsp?arnumber+5704324.

Zong, et al., "Applying Data Mining Techniques in Software Development", 2010, 4 pages, http://ieeexplore.ieee.org/stamp/stamp.jsp?arnumber=5477841.

\* cited by examiner

METHOD FOR IDENTIFYING BUNDLED SOFTWARE AND APPARATUS THEREFOR

CROSS REFERENCE TO RELATED APPLICATIONS

This application is a continuation application of co-pending U.S. patent application Ser. No. 14/586,875, filed on Dec. 30, 2014, which claims priority under 35 U.S.C. § 119(a) from Patent Application No. 201410305946.9 filed in the People's Republic of China on Jun. 30, 2014, all of which are expressly incorporated herein by reference in their entireties and for all purposes.

TECHNICAL FIELD

The present invention relates to the technical field of Internet networks, and in particular to a method for identifying bundled software and an apparatus therefor.

BACKGROUND

In order to promote the sales of their software, software developers will expand their marketing channels as far as possible, and by bundling the software with other software, when other software is installed, and in the case where a user directly clicks to install the software by default, the bundled software will be installed on the user's computer without the user knowing.

In the prior art, relevant information about a new process is learned by means of an event of capturing the process of a currently installed program and then creating a new process for bundled software, and whether the new process is bundled software will be determined by means of the relevant information about the new process. However, the means of identifying the new process of the bundled software in the prior art can identify the bundled software after starting the bundled software process, and therefore, system resources are occupied, anti-bundling on the bundled software in advance cannot be performed, and information such as the name, purpose, etc. about the bundled software cannot be identified.

SUMMARY

The embodiments of the present invention provide a method for identifying bundled software and an apparatus therefor, and bundled software is identified before a user installs software, thereby having the effect of anti-bundling.

In order to achieve the above objective, the embodiments of the present invention adopt the following technical solutions:

a method for identifying bundled software, the method for identifying bundled software comprising:

detecting a user interface for software installation, and acquiring text information on the user interface;

determining whether bundled software exists by matching the text information with preset text indicating software bundling; and if it is determined that bundled software exists, then extracting the name of the bundled software and the amount of bundled software from the text information, and prompting the name and amount of the bundled software.

An apparatus for identifying bundled software, the apparatus for identifying bundled software comprises:

a text detection module for detecting a user interface for software installation, and acquiring text information on the user interface of software to be installed;

a text matching module for determining whether bundled software exists by matching the text information with preset text indicating software bundling; and a first acquisition module for, if it is determined that bundled software exists, then extracting the name of the bundled software and acquiring the amount of bundled software from the text information, and prompting the name and amount of the bundled software.

The method for identifying bundled software and apparatus therefor provided in the embodiments of the present invention identify bundled software before installing the software to be installed and avoid starting the bundled software process, having the effect of anti-bundling on the bundled software in advance; by extracting the name of the bundled software and acquiring the amount of bundled software, and prompting the name and amount of the bundled software, a user is able to determine whether to install the bundled software according to his/her requirements, thereby improving the autonomous right of selection of the user in the process of installing software.

DETAILED DESCRIPTION OF THE PREFERRED EMBODIMENTS

What is provided in the embodiments of the present invention will be described in detail below in conjunction with the accompanying drawings.

Figure 1:
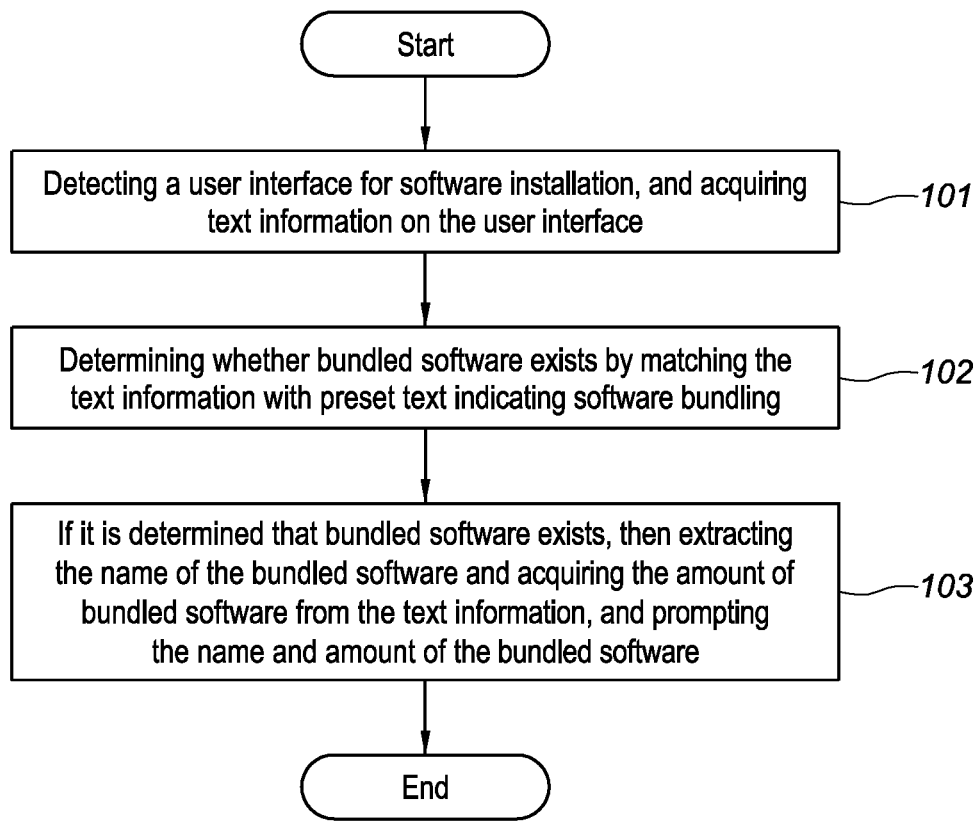
FIG. 1 is a schematic flowchart of a method for identifying bundled software provided in one embodiment of the present invention.

FIG. 1 is a schematic flowchart of a method for identifying bundled software provided in one embodiment of the present invention; and as shown in FIG. 1, the method for identifying bundled software provided in the embodiment of the present invention specifically comprises:

step 101, detecting a user interface for software installation, and acquiring text information on the user interface;

step 102, determining whether bundled software exists by matching the text information with preset text indicating software bundling; and step 103, if it is determined that bundled software exists, then extracting the name of the bundled software and acquiring the amount of bundled software from the text information, and prompting the name and amount of the bundled software.

The method for identifying bundled software provided in the embodiments of the present invention identifies bundled software before installing the software to be installed and avoids starting the bundled software process, having the effect of anti-bundling on the bundled software in advance; by extracting the name of the bundled software and acquiring the amount of bundled software, and prompting the name and amount of the bundled software, a user is able to determine whether to install the bundled software according to his/her requirements, thereby improving the autonomous right of selection of the user in the process of installing software.

Figure 2:
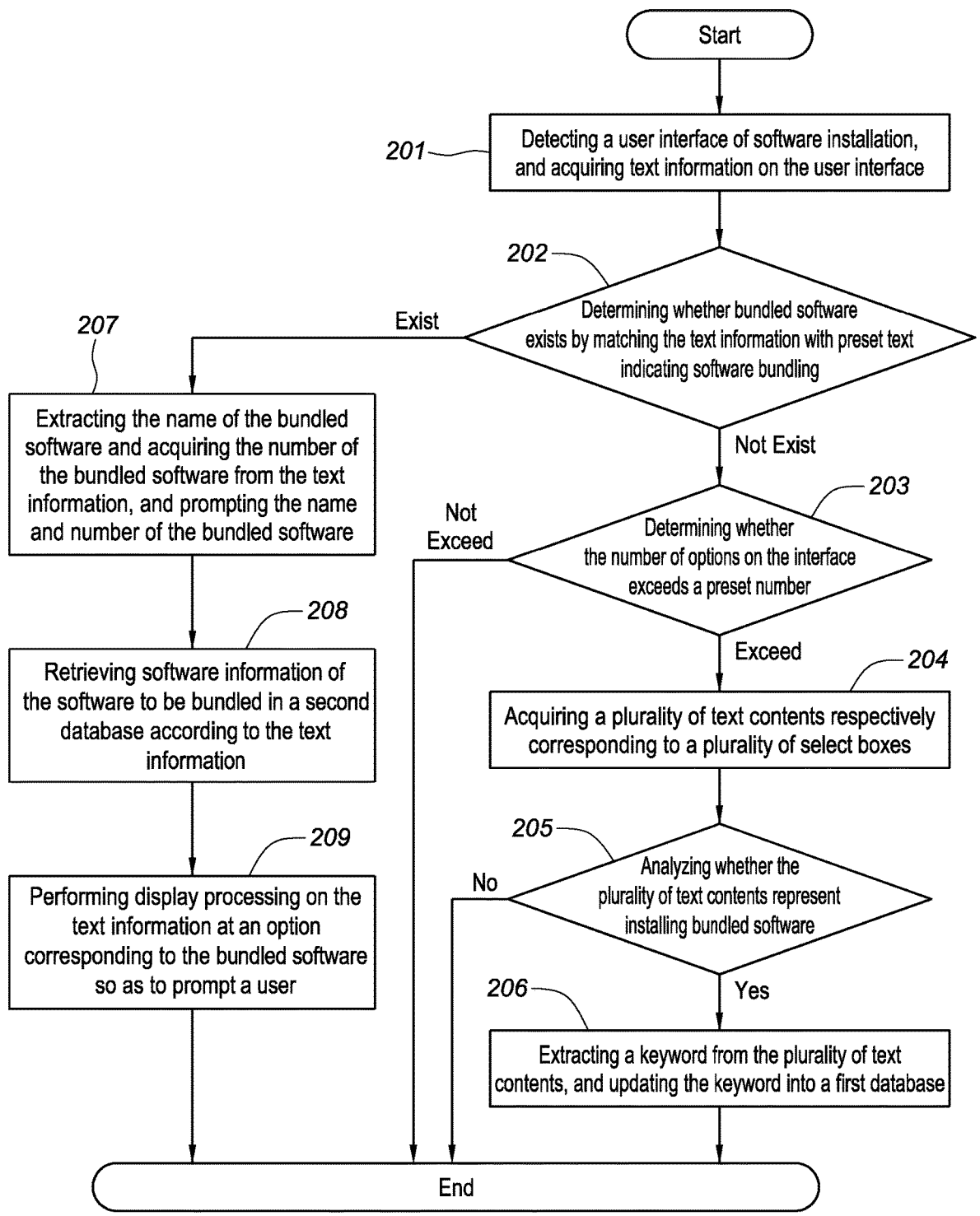
FIG. 2 is a schematic flowchart of a method for identifying bundled software provided in another embodiment of the present invention.
Figure 3:
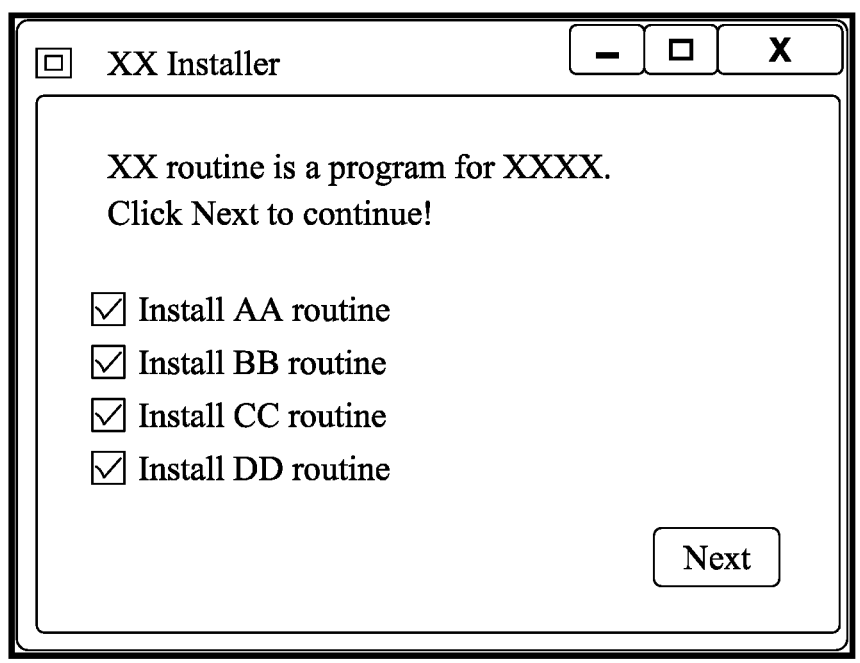
FIG. 3 is a schematic diagram of an interface for prompting about bundled software in step 201 of the embodiment shown in FIG. 2.
Figure 4:
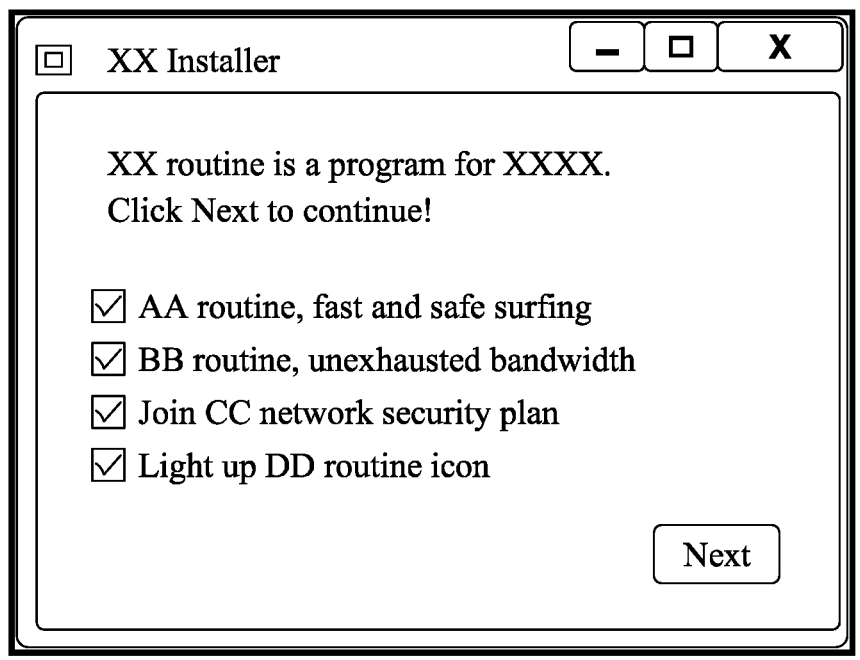
FIG. 4 is a schematic diagram of an interface for prompting about bundled software in step 203 of the embodiment shown in FIG. 2.

FIG. 2 is a schematic flowchart of a method for identifying bundled software provided in another embodiment of the present invention; FIG. 3 is a schematic diagram of an interface for prompting about bundled software in step 201 of the embodiment shown in FIG. 2; FIG. 4 is a schematic diagram of an interface for prompting about bundled software in step 203 of the embodiment shown in FIG. 2; and as shown in FIG. 2, the method for identifying bundled software provided in the embodiment of the present invention specifically comprises:

step 201, a user interface for software installation is detected, and text information on the user interface is acquired.

Specifically, as shown in FIG. 3, on a user interface of software to be installed, options such as "install AA program", "install BB program", "use CC program" and "use DD program" exist, and by carrying out step 201, the above-mentioned text information on the interface of the software to be installed may be acquired.

Step 202, whether bundled software exists is determined by matching the text information with preset text indicating software bundling; and if bundled software does not exist, step 203 is carried out; and if bundled software exists, step 207 is carried out.

Specifically, as shown in FIG. 3, text information such as "install AA program", "install BB program", "use CC program" and "use DD program" is matched with preset text, and the preset text is, for example, "install", "use", etc., and the text information on the interface is matched with the preset text so that it can be determined that bundled software exists on the installed software. In addition, the preset text may also be the name of the bundled software, and the name of the bundled software may be defined according to the purpose or an attribute of the corresponding bundled software. Certainly, those skilled in the art may understand that FIG. 3 is merely an example, and if bundled software does not exist on the interface, it is also necessary to combine with a selection box on the interface of the software to be installed for further judgment.

Step 203, the selection box on the interface of the software to be installed is detected, and whether the number of options on the interface exceeds a preset number is determined, and if so, step 204 is carried out, and if not, the flow ends.

Specifically, in the case of not detecting the bundled software through step 202, since in a normal case, except for information about confirming the installation type of the software to be installed, etc. in a selection box on the user interface in the installation process, the number of selection boxes on the interface is usually not too large, and therefore, the number of selection boxes on the interface may be detected to further determine whether there is bundled software. As shown in FIG. 4, the interface of the bundled software does not have preset text such as "install" and "use", and at this point it is necessary to perform further judgment by detecting the number of selection boxes on the interface. Furthermore, the selection box may specifically be any combination of a checkbox and a combobox, for example, it may be a plurality of checkboxes or a plurality of comboboxes, and may also be a combination of a plurality of checkboxes and a plurality of comboboxes, and may also be a combination of a checkbox and a plurality of comboboxes; therefore, those skilled in the art may understand that the embodiment of the present invention does not define the specific combination means of the checkbox and the combobox. In one embodiment, it is detected that there are 4 selection boxes on the interface, while the preset number is 1, and in the case where the number of selection boxes actually existing on the interface is greater than the preset number 1, then it may be determined that bundled software exists.

Step 204, a plurality of text contents respectively corresponding to a plurality of selection boxes are acquired, and step 205 is carried out.

As shown in FIG. 4, through step 204, text contents respectively corresponding to 4 selection boxes on the interface may be acquired, for example, "AA program, faster and securer Internet surfing", "BB program, limitless network traffic", "join CC network security plan" and "light up DD program icon".

Step 205, whether the plurality of text contents represent installation of bundled software is analyzed, and if so, step 206 is carried out, and if not, the flow ends.

By means of analyzing the text contents acquired in the above-mentioned step 204, whether "AA program", "BB program", "CC network security", "DD program", etc. are bundled software is further determined.

Step 206, a keyword is extracted from the plurality of text contents, and the keyword is updated into a first database, and the flow ends.

After the analysis through the above-mentioned step 205, "AA program", "BB program", "CC network security", "DD program", etc. are updated into the first database as keywords, and by means of updating the first database, preset text may be obtained from the first database when the above-mentioned step 201 is carried out, such that a self-learning process of the database where the preset text is located may be implemented and the accuracy of identifying bundled software may be improved.

Step 207, the name of the bundled software is extracted and the amount of bundled software is acquired from the text information, and the name and amount of the bundled software are prompted, and step 208 is carried out.

For example, in the above-mentioned step 201, after it is determined that bundled software exists, by means of extracting "AA", "BB", "CC" and "DD" from the text contents "install AA program", "install BB program", "use CC program" and "use DD program", the name of the bundled software may be learned and the amount of bundled software may be acquired.

In step 207, the name of the bundled software and the amount of bundled software acquired may be prompted by way of popping up a dialog box.

Step 208, software information of the software to be bundled is retrieved in a second database according to the name of the bundled software, and the software information of the software to be bundled is retrieved in the second database, and step 209 is carried out.

Specifically, the second database may be a set software management software library or an encyclopedia database provided by a network service provider, and introduction (for example, the version, company and function of the software to be bundled) to the software to be bundled may be displayed by means of retrieving the software to be bundled in the second database, so that a user can refer thereto and decide whether to install the bundled software.

Step 209, display processing is performed on the text information at an option corresponding to the bundled software so as to prompt a user, and the flow ends.

Specifically, the display processing may in particular be performing highlight or color changing color processing on the text information corresponding to the bundled software so as to attract the attention of the user.

The method for identifying bundled software provided in the embodiments of the present invention identifies bundled software before installing the software to be installed and avoids starting the bundled software, having the effect of anti-bundling on the bundled software in advance; by acquiring the name of the bundled software and the amount of bundled software, and prompting the name and amount of the bundled software, a user is able to determine whether to install the bundled software according to his/her requirements, thereby improving the autonomous right of selection of the user in the process of installing software.

Figure 5:
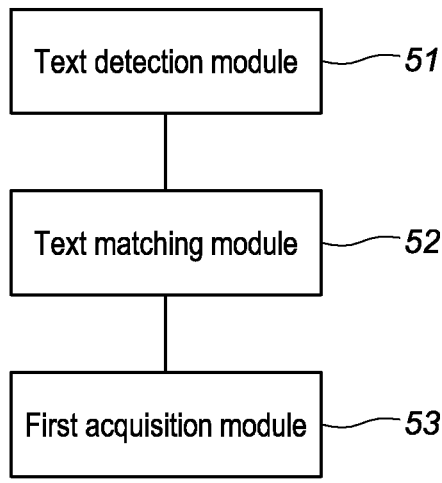
FIG. 5 is a schematic diagram of the structure of an apparatus for identifying bundled software provided in one embodiment of the present invention.

FIG. 5 is a schematic diagram of the structure of an apparatus for identifying bundled software provided in one embodiment of the present invention; and as shown in FIG. 5, the apparatus for identifying bundled software provided in the embodiment of the present invention specifically comprises:

a text detection module 51 for detecting a user interface for software installation, and acquiring text information on the user interface of software to be installed;

a text matching module 52 for determining whether bundled software exists by matching the text information with preset text indicating software bundling; and a first acquisition module 53 for, if it is determined that bundled software exists, then extracting the name of the bundled software and acquiring the amount of bundled software from the text information, and prompting the name and amount of the bundled software.

The beneficial technical effects of the embodiments of the present invention may refer to the beneficial technical effects of the embodiment as shown in FIG. 1 above, which will not be described here again redundantly.

Figure 6:
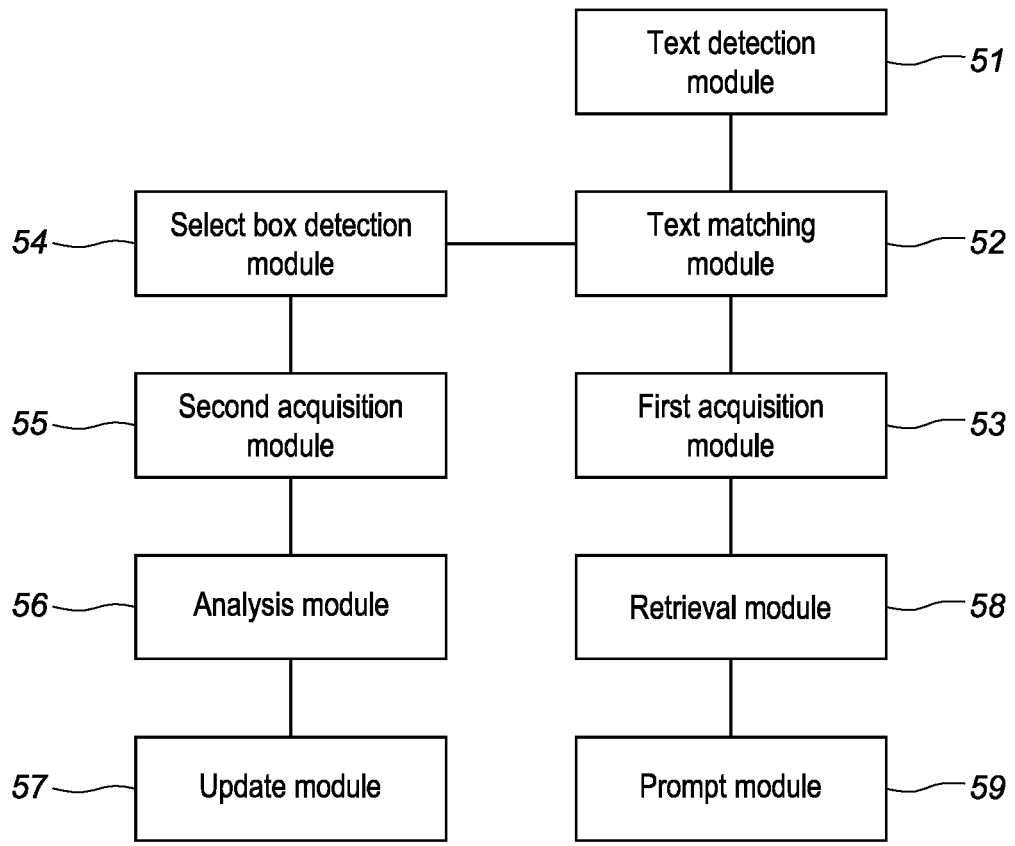
FIG. 6 is a schematic diagram of the structure of an apparatus for identifying bundled software provided in another embodiment of the present invention.

FIG. 6 is a schematic diagram of the structure of an apparatus for identifying bundled software provided in another embodiment of the present invention; and as shown in FIG. 6, on the basis of the embodiment as shown in FIG. 5 above, the apparatus for identifying bundled software provided in the embodiment of the present invention may further comprise:

a selection box detection module 54 for, if it is determined that the bundled software does not exist, detecting a selection box on the user interface of the software to be installed;

a second acquisition module 55 for, if the number of selection boxes on the user interface exceeds a preset number, then acquiring a plurality of text contents respectively corresponding to a plurality of selection boxes;

an analysis module 56 for analyzing whether the plurality of text contents are the bundled software; and an update module 57 for, if the plurality of text contents represent installing the bundled software, then extracting a keyword from the plurality of text contents, and updating the keyword into a first database.

A retrieval module 58 is used for retrieving software information of the software to be bundled in a second database according to the name of the bundled software.

A prompt module 59 is used for performing display processing on the text information at an option corresponding to the bundled software so as to prompt a user.

The beneficial technical effects of the embodiments of the present invention may refer to the beneficial technical effects of the embodiments as shown in FIGS. 2-4 above, which will not be described here again redundantly.

What are described above are only specific implementations of the present invention; however, the scope of protection of the present invention is not limited to this. Variations or replacements readily conceivable to those skilled in the art within the technical scope disclosed in the present invention should fall within the scope of protection of the present invention. Therefore, the scope of protection of the present invention shall be subject to the scope of protection of the claims.

What is claimed is:

1. A method for identifying bundled software being bundled with software to be installed on a computer, the method being performed by software instruction executed by a processor of the computer, comprising:
    detecting a user interface being displayed via the computer and associated with an installation process for the software to be installed;
    acquiring text information on the user interface;
    determining whether the bundled software is bundled with the software to be installed based on the text information by matching the text information with preset text indicating software bundling;
    detecting one or more selection boxes on the user interface upon determining that the bundled software does not exist based upon the text information;
    determining whether a number of the selection boxes on the user interface is greater than a predetermined number;
    acquiring a plurality of text contents corresponding to the selection boxes based upon a determination that the number of the selection boxes is greater than the predetermined number;
    analyzing whether the plurality of text contents represent installation of the bundled software; and
    based upon said analyzing, extracting a keyword from the plurality of text contents and updating the keyword into a first database.

2. The method of claim 1, wherein the bundled software includes at least one bundled software program, and wherein the method further comprises prompting a name and a number of the at least one bundled software program by displaying the name and the number on the computer upon determining that the bundled software exists based upon the text information.

3. The method of claim 1, further comprising obtaining the preset text from the first database.

4. A method for identifying bundled software being bundled with software to be installed on a computer, the method being performed by software instruction executed by a processor of the computer, comprising:
    detecting a user interface being displayed via the computer and associated with an installation process for the software to be installed on the computer;
    acquiring text information on the user interface;
    determining whether the bundled software is bundled with the software to be installed based on the text information, the bundled software including at least one bundled software program;

detecting one or more selection boxes on the user interface upon determining that the bundled software does not exist based upon the text information;

determining whether a number of the selection boxes on the user interface is greater than a predetermined number;

acquiring a plurality of text contents corresponding to the selection boxes based upon a determination that the number of the selection boxes is greater than the predetermined number;

analyzing whether the plurality of text contents represent installation of the bundled software; and based upon said analyzing, extracting a keyword from the plurality of text contents and updating the keyword into a first database.

5. The method of claim 4, wherein said determining whether the bundled software is bundled with the software to be installed comprises matching the text information with preset text indicating software bundling.

6. The method of claim 5, wherein said matching comprises matching the text information with the preset text, the preset text including a text string of "install", a text string of "use", a name of the at least one bundled software program, or a combination thereof.

7. The method of claim 5, further comprising obtaining the preset text from the first database.

8. The method of claim 4, further comprising prompting a name and a number of the at least one bundled software program by displaying the name and the number on the computer upon determining that the bundled software is bundled with the software based on the text information.

9. The method of claim 8, wherein said prompting includes extracting the name of the at least one bundled software program from the text information.

10. The method of claim 8, wherein said prompting includes acquiring the number of the at least one bundled software program from the text information.

11. The method of claim 8, further comprising retrieving software information of the at least one bundled software program in a second database according to the name of the at least one bundled software program.

12. The method of claim 8, further comprising performing display processing on the text information at an option corresponding to the at least one bundled software program to present a user prompt.

13. The method of claim 12, wherein said performing comprises highlighting the text information at the option corresponding to the at least one bundled software program.

14. The method of claim 12, wherein said performing comprises changing a color of the text information at the option corresponding to the at least one bundled software program.

15. The method of claim 8, wherein said prompting comprises prompting the name and the number by popping up a dialog box that displays the name and the number.

16. The method of claim 4, wherein said determining whether the number of the selection boxes is greater than the predetermined number includes determining whether the number of the selection boxes on the user interface is greater than one, and wherein said acquiring the plurality of text contents comprises acquiring the plurality of text contents corresponding to the selection boxes based upon determining a determination that the number of selection boxes is greater than one.

17. An apparatus for identifying bundled software being bundled with software to be installed on a computer, comprising:

a processor; and a computer storage medium having one or more programs stored thereon for instructing said processor to:

detect a user interface being displayed via the computer and associated with an installation process for the software to be installed on the computer;

acquire text information on the user interface;

determine whether the bundled software is bundled with the software to be installed based on the text information, the bundled software including at least one bundled software program;

detect one or more selection boxes on the user interface upon determining that the bundled software does not exist based upon the text information;

determine whether a number of the selection boxes on the user interface is greater than a predetermined number;

acquire a plurality of text contents corresponding to the selection boxes based upon a determination that the number of the selection boxes is greater than the predetermined number;

analyze whether the plurality of text contents represent installation of the bundled software; and based upon said analyzing, extract a keyword from the plurality of text contents and update the keyword into a first database.

* * * * *